US008212824B1

United States Patent
Allen et al.

(10) Patent No.: US 8,212,824 B1
(45) Date of Patent: Jul. 3, 2012

(54) APPARATUS AND METHOD FOR SERIAL SAVE AND RESTORE OF GRAPHICS PROCESSING UNIT STATE INFORMATION

(75) Inventors: Roger L. Allen, Lake Oswego, OR (US); Nitij Mangal, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 532 days.

(21) Appl. No.: 11/313,086

(22) Filed: Dec. 19, 2005

(51) Int. Cl.
 *G06F 15/16* (2006.01)
(52) U.S. Cl. .................... 345/502; 345/557; 712/228
(58) Field of Classification Search .................. 345/502, 345/557; 712/228
 See application file for complete search history.

(56) References Cited

U.S. PATENT DOCUMENTS

| | | | | |
|---|---|---|---|---|
| 4,794,521 | A | 12/1988 | Ziegler et al. | |
| 5,613,114 | A * | 3/1997 | Anderson et al. | 395/678 |
| 5,818,469 | A * | 10/1998 | Lawless et al. | 345/522 |
| 6,208,361 | B1 * | 3/2001 | Gossett | 345/536 |
| 6,334,180 | B1 | 12/2001 | Petrick | |
| 6,341,347 | B1 * | 1/2002 | Joy et al. | 712/228 |
| 6,735,659 | B1 * | 5/2004 | Nakanishi et al. | 710/305 |
| 6,782,432 | B1 * | 8/2004 | Nelson et al. | 710/1 |
| 6,915,414 | B2 * | 7/2005 | Yearsley et al. | 712/219 |
| 6,952,214 | B2 * | 10/2005 | Naegle et al. | 345/506 |
| 7,015,913 | B1 * | 3/2006 | Lindholm et al. | 345/501 |
| 2001/0014931 | A1 * | 8/2001 | Aglietti et al. | 711/129 |
| 2002/0118202 | A1 * | 8/2002 | Baldwin | 345/530 |
| 2003/0046607 | A1 | 3/2003 | May et al. | |
| 2003/0126367 | A1 * | 7/2003 | Revilla et al. | 711/122 |
| 2003/0140179 | A1 * | 7/2003 | Wilt et al. | 709/321 |
| 2003/0212874 | A1 | 11/2003 | Alderson | |
| 2004/0008200 | A1 * | 1/2004 | Naegle et al. | 345/505 |
| 2004/0015899 | A1 | 1/2004 | May et al. | |
| 2004/0225917 | A1 * | 11/2004 | Doing et al. | 714/28 |
| 2004/0243984 | A1 | 12/2004 | Vorbach et al. | |
| 2005/0005088 | A1 * | 1/2005 | Yearsley et al. | 712/235 |
| 2005/0022062 | A1 | 1/2005 | Vorbach | |
| 2005/0264579 | A1 * | 12/2005 | Malka et al. | 345/582 |
| 2006/0090062 | A1 | 4/2006 | Vorbach et al. | |
| 2006/0259487 | A1 | 11/2006 | Havens et al. | |
| 2007/0006040 | A1 | 1/2007 | Carrie et al. | |
| 2007/0103474 | A1 * | 5/2007 | Huang et al. | 345/506 |

* cited by examiner

*Primary Examiner* — Maurice L McDowell, Jr.
(74) *Attorney, Agent, or Firm* — Cooley LLP

(57) ABSTRACT

A graphics processing unit includes a first processing controller controlling a first set of multi-threaded processors. A second processing controller controls a second set of multi-threaded processors. A serial bus connects the first processing controller to the second processing controller. The first processing controller gathers first state information from the first set of multi-threaded processors in response to a context switch token and then passes the context switch token over the serial bus to the second processing controller. The second processing controller gathers second state information from the second set of multi-threaded processors in response to the context switch token.

11 Claims, 9 Drawing Sheets

APPARATUS AND METHOD FOR SERIAL SAVE AND RESTORE OF GRAPHICS PROCESSING UNIT STATE INFORMATION

BRIEF DESCRIPTION OF THE INVENTION

This invention relates generally to graphics processing. More particularly, this invention relates to a low overhead technique for serial save and restore of execution state of a program executing on a graphics processing unit.

BACKGROUND OF THE INVENTION

When the execution of an application switches from a first context to a second context, it is necessary to save the state information associated with the first context. When the second context is completed, the state information associated with the first context must be restored so that execution of the first context may be completed. The state information to be stored and restored may include register values, pointers, program counters, condition codes and the like.

There are different techniques to recover state information from a graphics processing unit. One approach is to use a central register control block and RAM chains. The problem with this approach is that RAM chains require dedicated wires to each RAM storing state information. This architecture becomes unwieldy. In addition, relying upon register accesses to transfer state information is relatively slow. Another approach to recover state information from a graphics processing unit is to route the state information from the processors of a graphics processing unit to a frame buffer. This approach results in long, parallel storage paths. While this approach provides improved data transfer speeds, it is relatively complex.

It would be desirable to provide a new mechanism for storing and restoring state information in the event of a context switch in a graphics processing unit.

SUMMARY OF THE INVENTION

The invention includes a graphics processing unit with a first processing controller controlling a first set of multi-threaded processors. A second processing controller controls a second set of multi-threaded processors. A serial bus connects the first processing controller to the second processing controller. The first processing controller gathers first state information from the first set of multi-threaded processors in response to a context switch token and then passes the context switch token over the serial bus to the second processing controller. The second processing controller gathers second state information from the second set of multi-threaded processors in response to the context switch token.

The invention also includes a graphics processing unit with a cache storing state information; a first processing controller controlling a first set of multi-threaded processors; a second processing controller controlling a second set of multi-threaded processors; and a serial bus connecting the cache, the first processing controller, and the second processing controller. The cache delivers state information over the serial bus to the first processing controller. The first processing controller selects a first set of state information to be restored to the first set of multi-threaded processors and delivers the remaining state information over the serial bus to the second processing controller. The second processing controller delivers the remaining state information to the second set of multi-threaded processors.

The invention also includes a method of operating a graphics processing unit. First state information is received from a first set of multi-threaded processors associated with a first processing controller. The first state information is routed over a serial bus to a second processing controller. The first state information is directed over the serial bus to a cache. Second state information is secured from a second set of multi-threaded processors associated with the second processing controller. The second state information is steered over the serial bus to the cache.

The invention also includes a method of operating a graphics processing unit by delivering state information to a first processing controller controlling a first set of multi-threaded processors. The first processing controller selects a first set of state information to be restored to the first set of multi-threaded processors. The remaining state information is routed to a second processing controller controlling a second set of multi-threaded processors. The remaining state information is loaded into the second set of multi-threaded processors.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
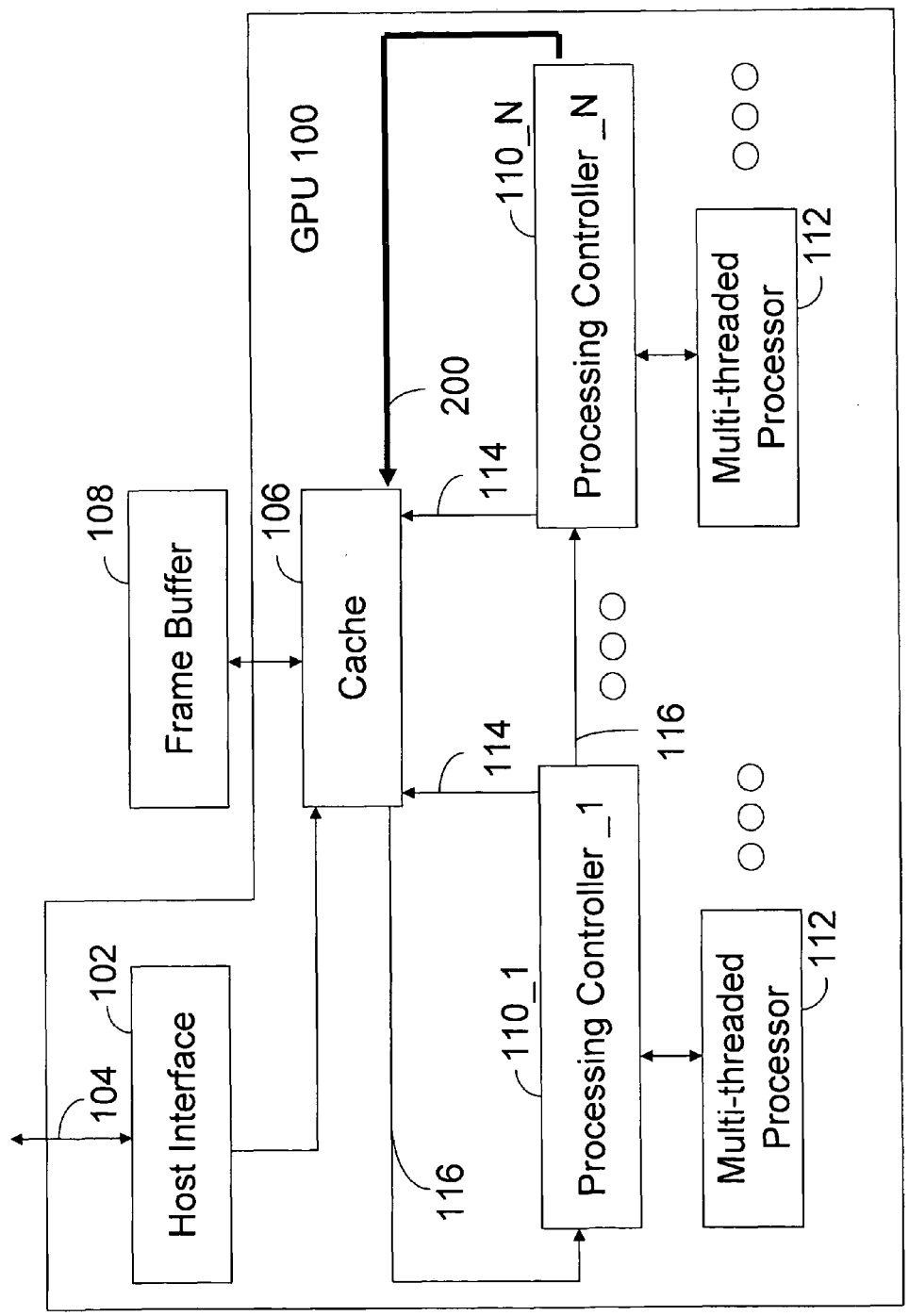
FIG. 1 illustrates a graphics processing unit with a closed loop serial bus utilized in accordance with an embodiment of the invention.

FIG. 1 illustrates a GPU 100 configured in accordance with an embodiment of the invention. The GPU 100 includes a host interface 102. The host interface 102 includes a bus 104 to other system components, such as a north bridge (not shown). The north bridge may also be connected to a central processing unit (not shown). The central processing unit may initiate a context switch command that is applied to the bus 104. The host interface 102 passes the context switch command to a cache 106 (e.g., a shader constant cache). The context switch command causes the cache 106 to store state information in accordance with the technique described below.

The cache 106 communicates with a set of processing controllers 110_1 through 110_N. Each processing controller 110 controls a set of multi-threaded processors 112. A serial bus 116 originates at the cache 106 and is serially connected to each processing controller 110. In response to a request on bus 114, the cache 106 applies data and/or commands to the serial bus 116 for deliver to the processing controllers 110. In prior art configurations, the serial bus 116 terminates at the last processing controller 110_N. The current invention includes an extended serial bus 200 connecting the last processing controller 110_N to the cache 106. Thus, the invention provides a closed-loop path to the cache 106. The extended serial bus 200 allows for a separate data path to the cache. In accordance with the invention, this separate data path is used to store state information. Thus, unlike the prior art, which relies upon register accesses or parallel paths from individual multi-threaded processors 112 back to the frame buffer 108, the invention utilizes a serial path back to the cache 106 and the frame buffer 108.

Figure 2:
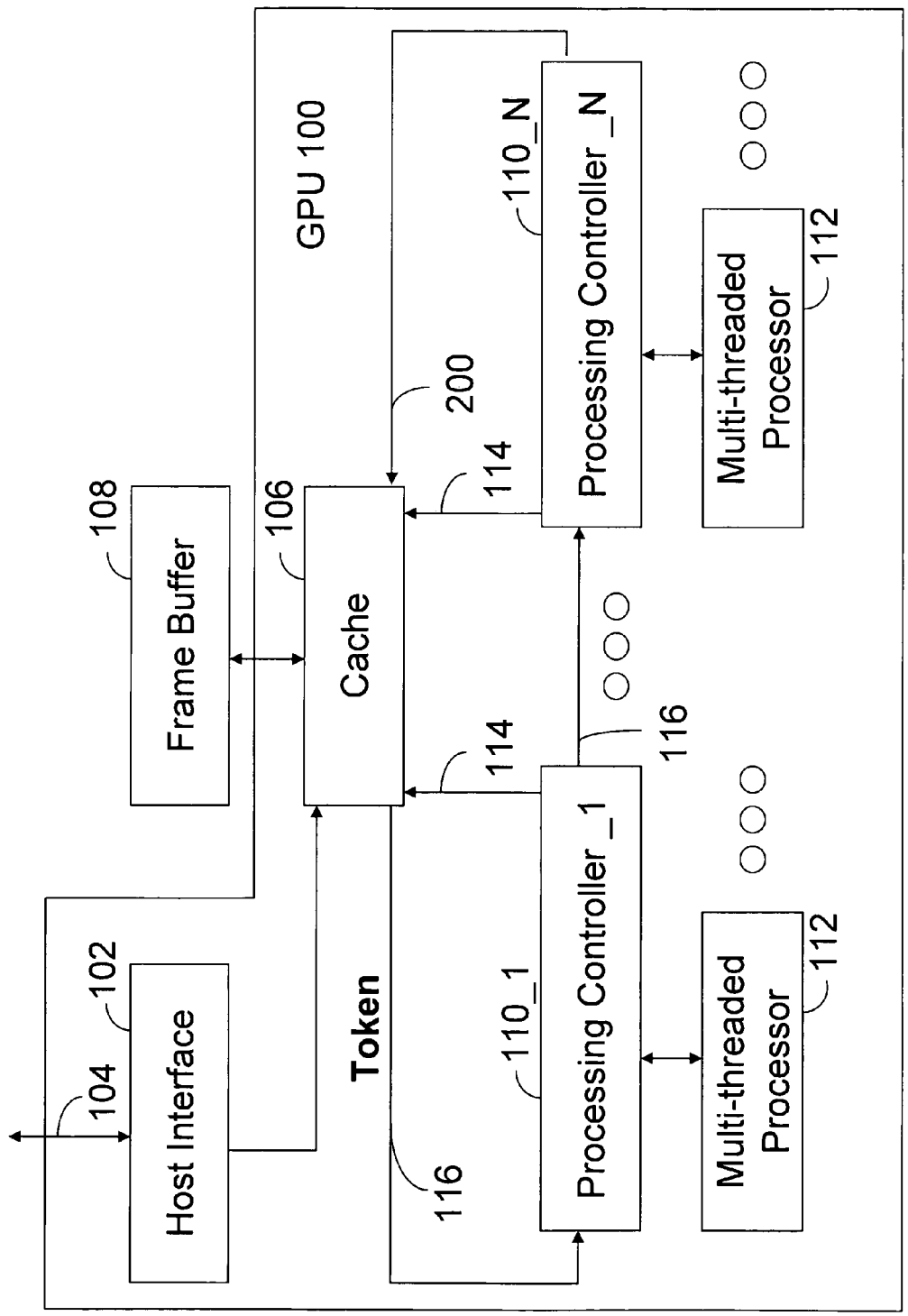
FIG. 2 illustrates the initial processing of a context switch token in accordance with an embodiment of the invention.
Figure 3:
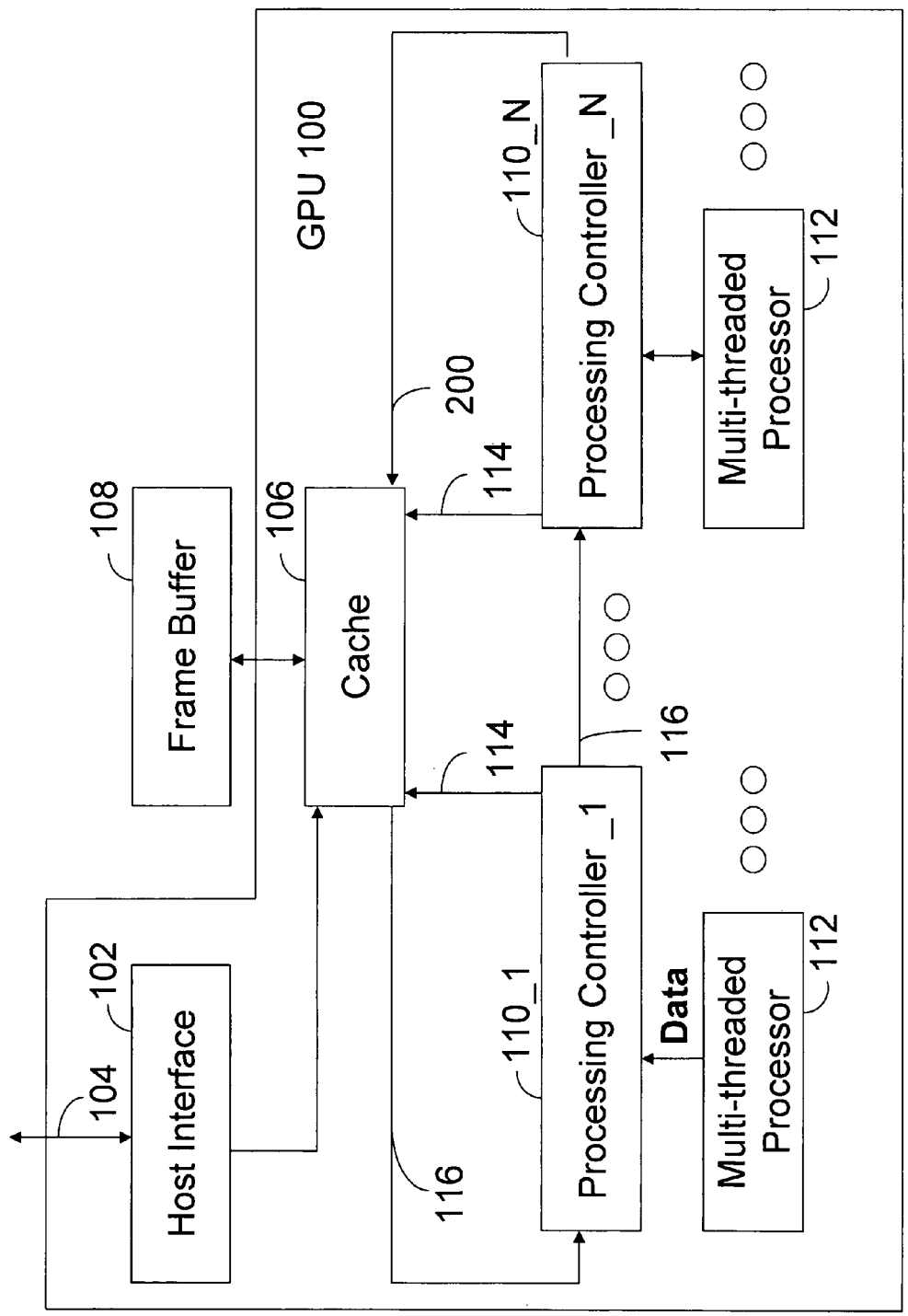
FIG. 3 illustrates the initiation of the storage of state information in response to the context switch token.

The serial loading of state information in accordance with the invention may be initiated by the presence of a token, which may be a separate symbol (e.g., a separate word or a specified bit) processed by the system. For example, the host interface 102 may receive the token from the CPU (not shown) in response to a context switch. In this case, the host interface passes the token to the cache 106, which, in turn, passes the token on serial bus 116 to the first processing controller 110_1, as shown in FIG. 2. The processing controller 110_1 is configured to respond to the token by initiating the capture of state information from the multi-threaded processors 112 that it services. Thus, as shown in FIG. 3, data (i.e., state information) is passed from each multi-threaded processor 112 to the processing controller 110_1 in response to the token.

Figure 4:
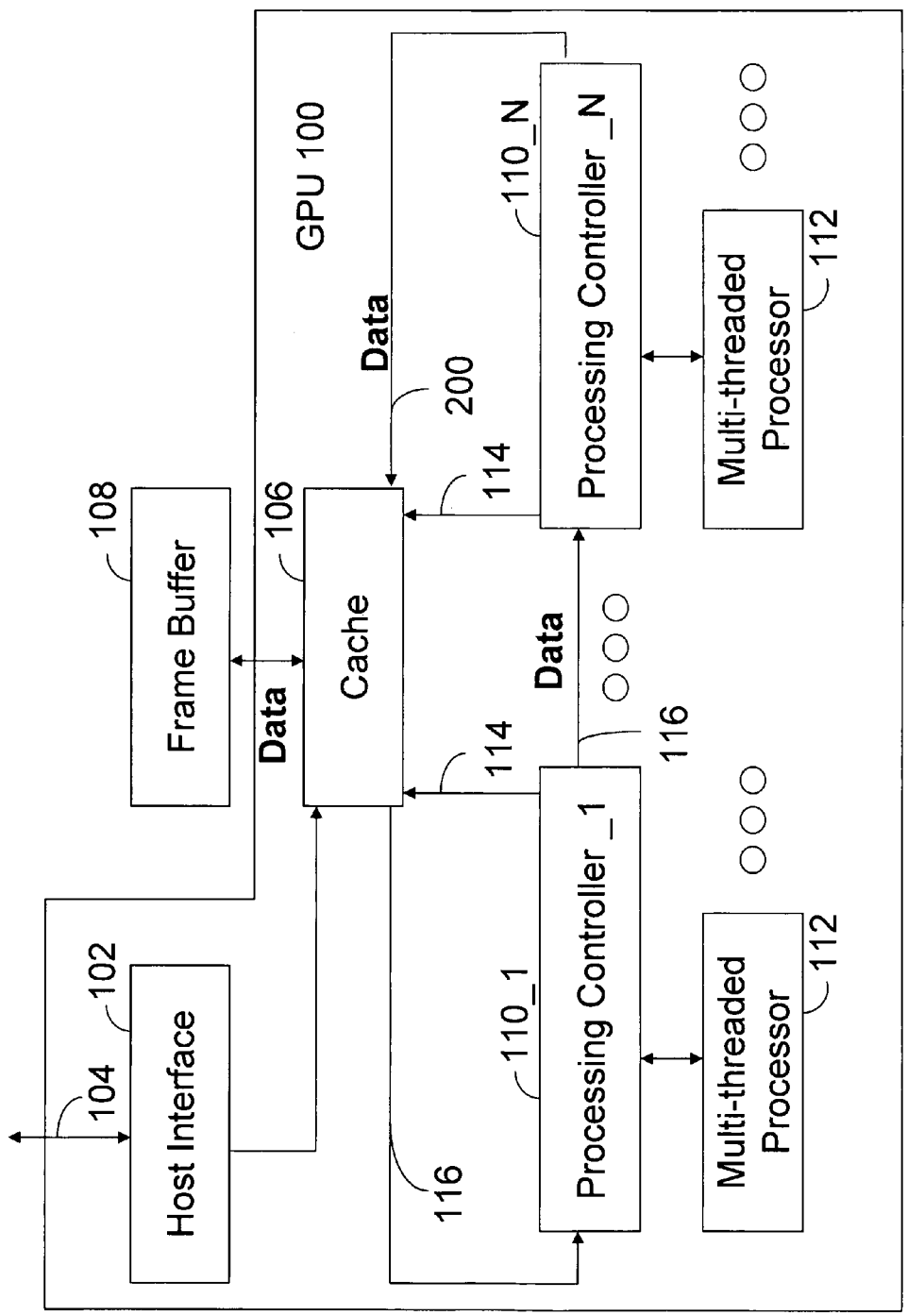
FIG. 4 illustrates the serial loading of state information from the first processing controller into the frame buffer in accordance with an embodiment of the invention.

As shown in FIG. 4, the data is then serially passed over the serial bus 116 to each processing controller 110, including the last processing controller 110_N. The last processing controller 110_N passes the data on the extended serial bus 200, which results in the data being loaded into the cache 106 and subsequently into the frame buffer 108.

Figure 5:
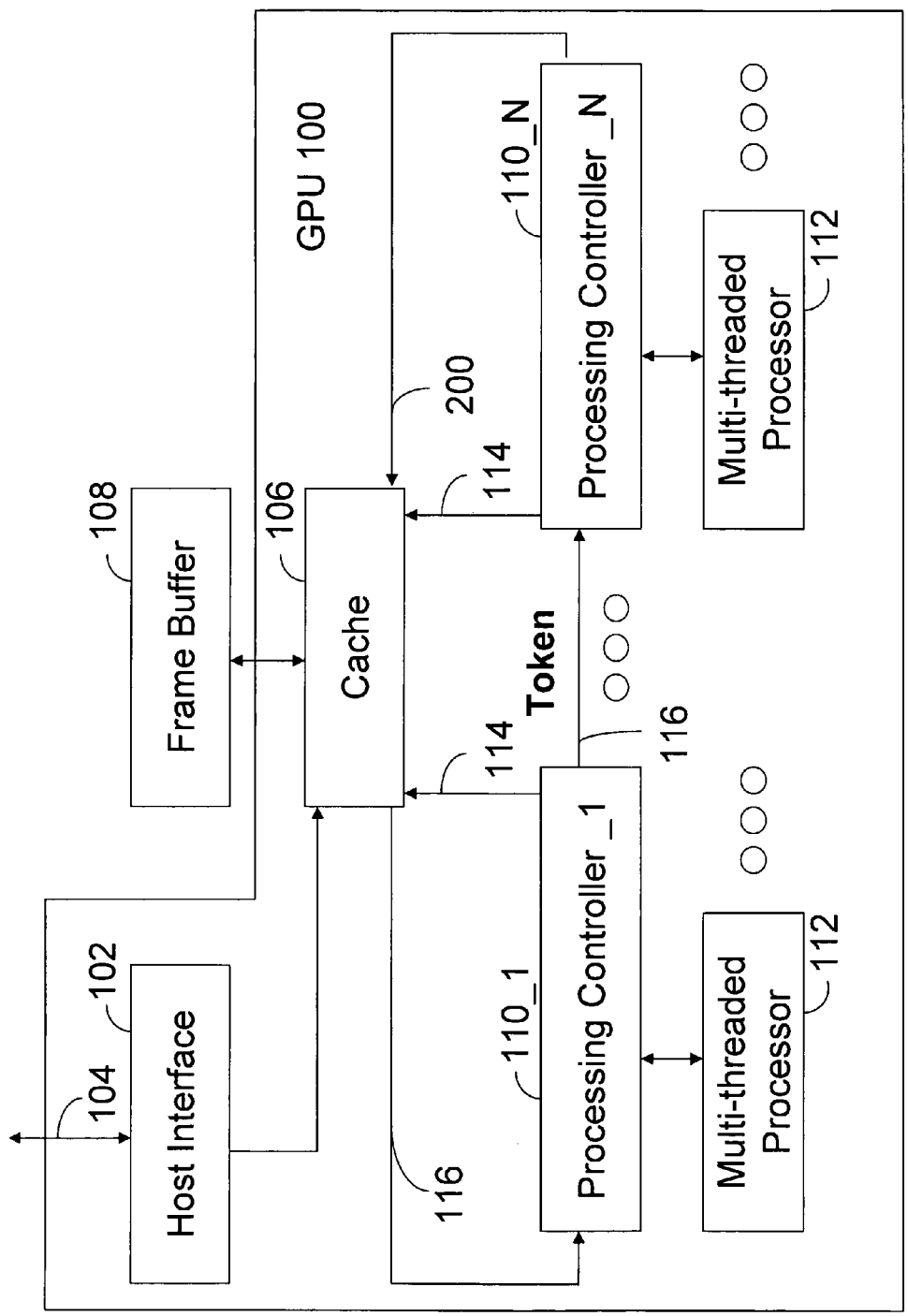
FIG. 5 illustrates the serial progression of the context switch token after all state information associated with the processing controller 110_1 is stored.

After all of the state information is drained from the multi-threaded processors 112 associated with the first processing controller 110_1, the first processing controller 110_1 passes the token to the next processing controller. This process is repeated until the last processing controller 110_N receives the token. FIG. 5 illustrates the last processing controller 110_N receiving the token on serial bus 116.

Figure 6:
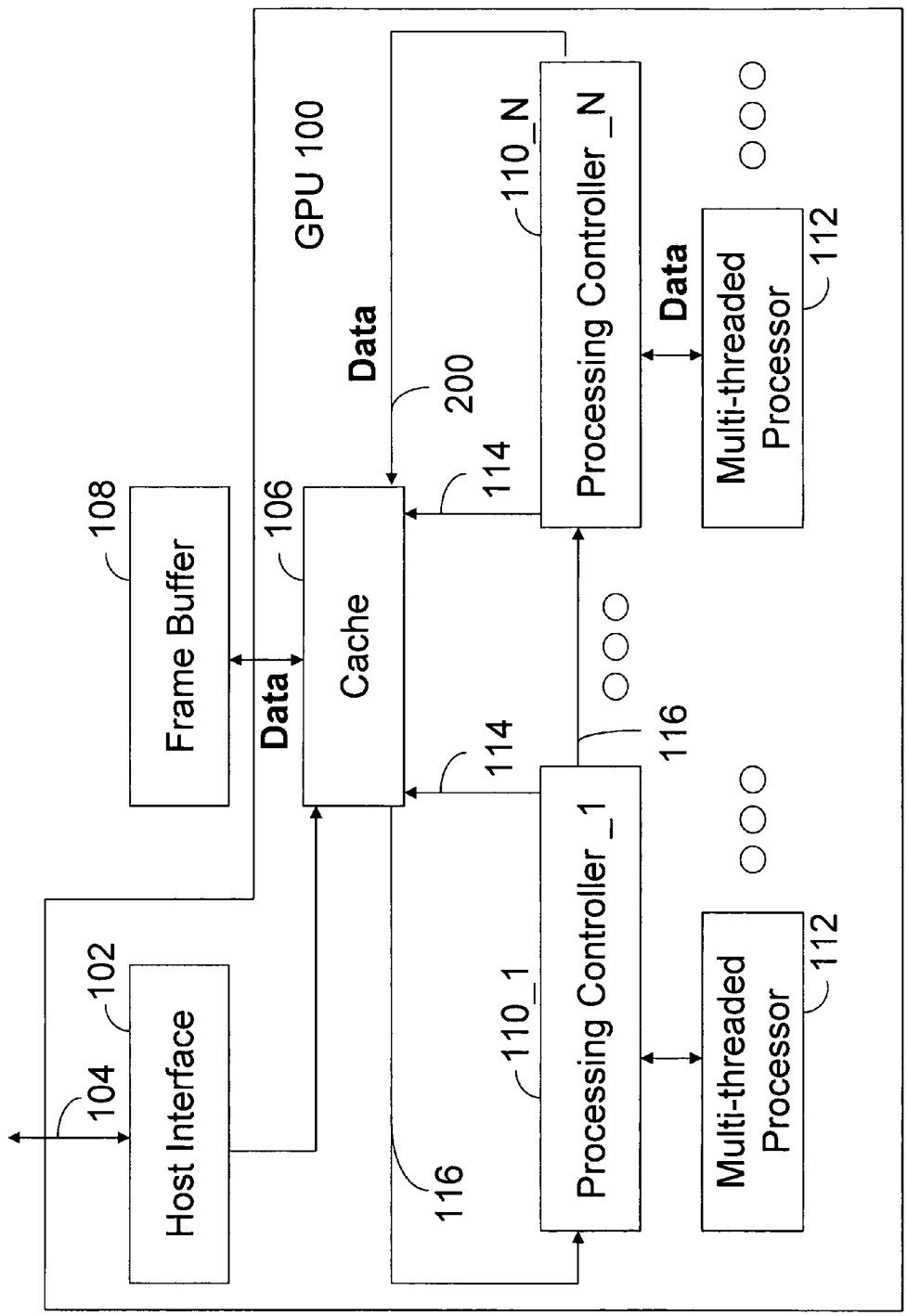
FIG. 6 illustrates the serial loading of state information from the last processing controller into the frame buffer in accordance with an embodiment of the invention.
Figure 7:
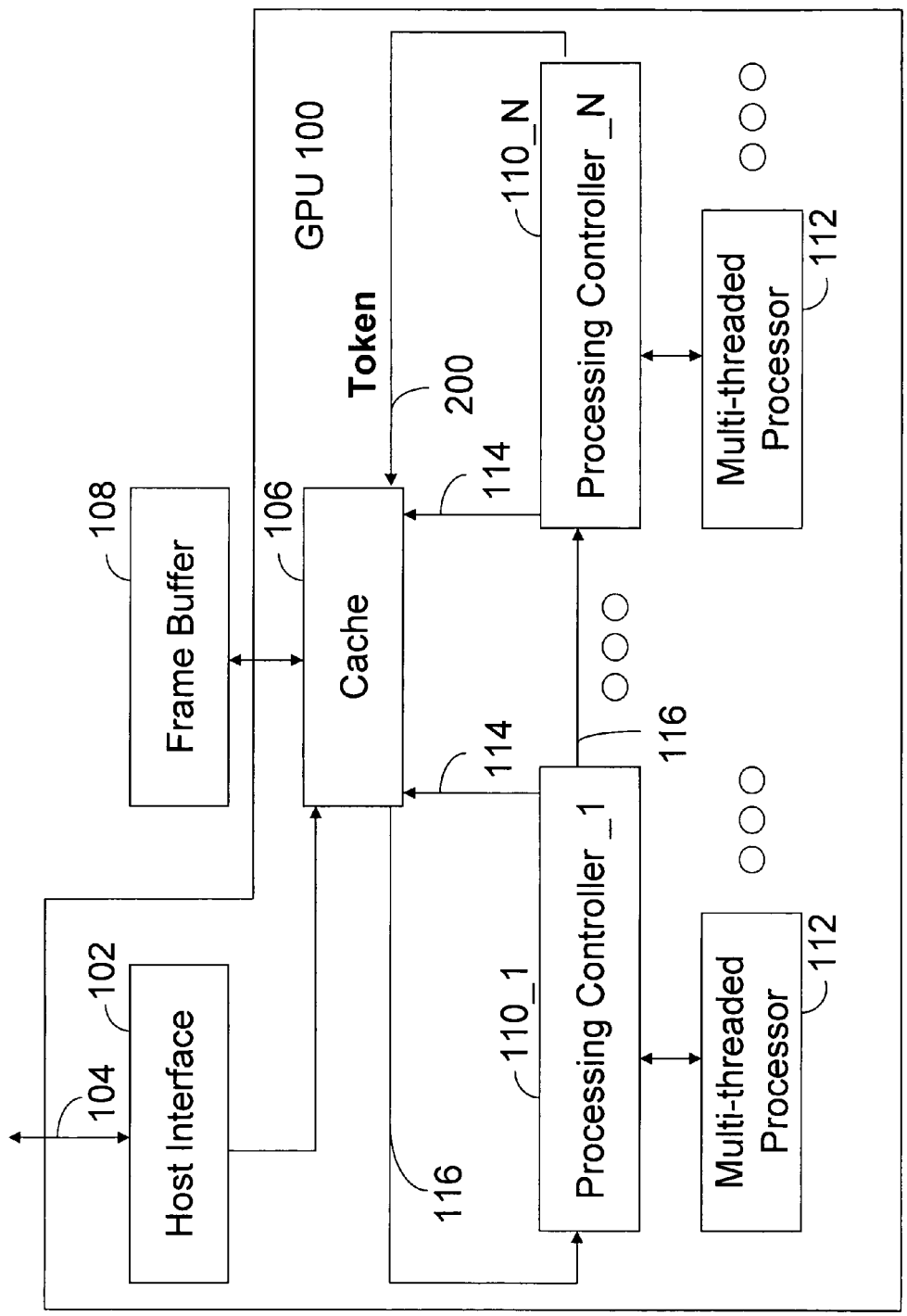
FIG. 7 illustrates the return of a token to the cache, which indicates the completion of the loading of the state information.

As shown in FIG. 6, the last processing controller 110_N responds to the token by retrieving state information from the multi-threaded processors 112 associated with the last processing controller 110_N. The retrieved data is then passed over the extended serial bus 200 to the cache 106 and ultimately to the frame buffer 108. After all of the state information is loaded from the multi-threaded processors 112 associated with the last processing controller 110_N, the last processing controller 110_N passes the token over the extended serial bus 200 to the cache, as shown in FIG. 7. The cache 106 is configured to receive the token from the extended serial bus 200 and recognize that at this point all of the state information has been retrieved. Therefore, the GPU 100 is now in a position to service another context. When the servicing of this other context is completed, the stored state information from the interrupted context may be restored. Thus, for example, the host interface 102 may receive a signal from the CPU to restore to the multi-threaded processors 112 the stored state information.

Figure 8:
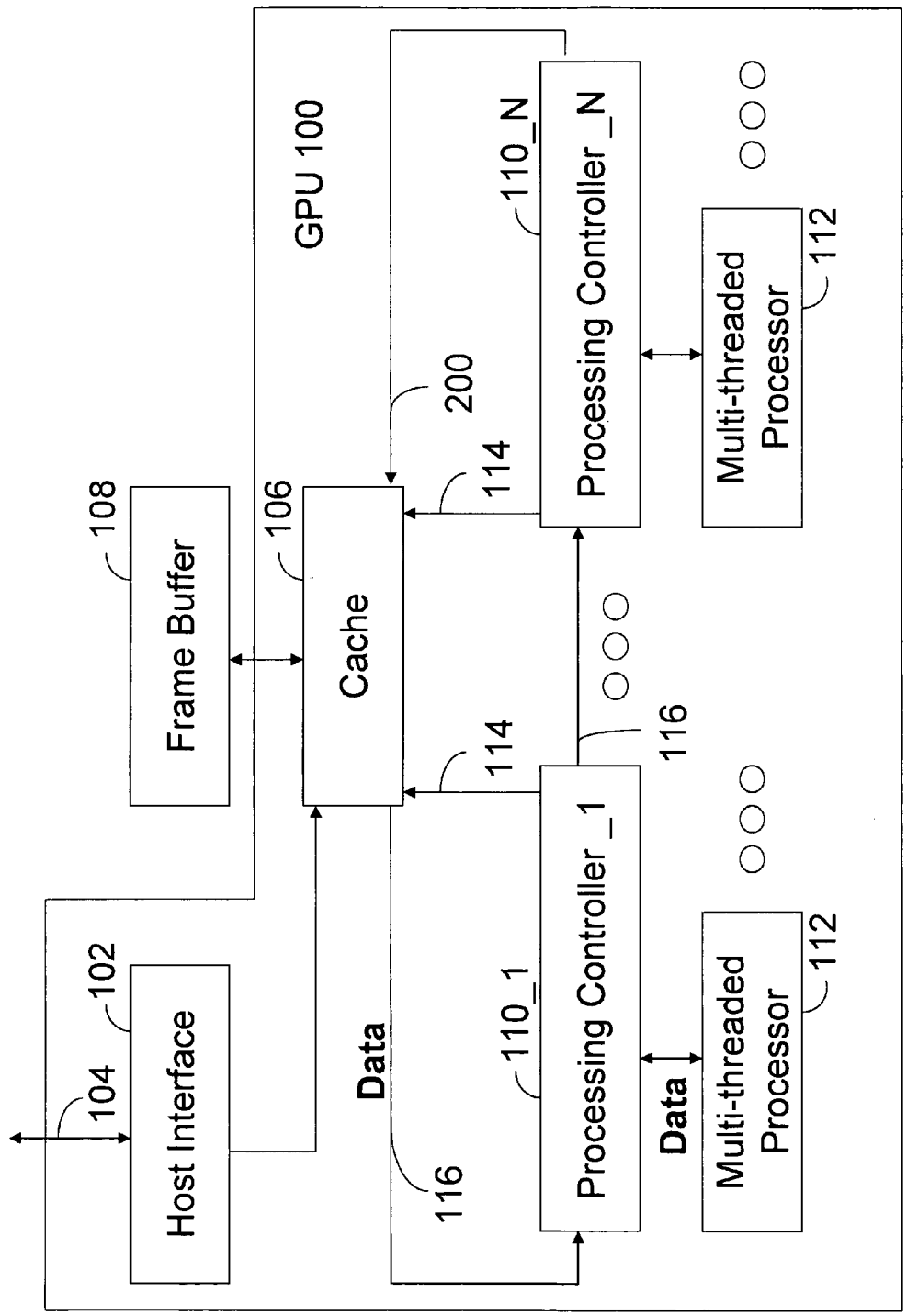
FIG. 8 illustrates restoring state information in accordance with an embodiment of the invention.

FIG. 8 illustrates the reloading of data (i.e., state information) into multi-threaded processors 112 associated with the first processing controller 110_1. The data initially moves from the frame buffer 108 into the cache 106. The cache 106 routes the data over the serial bus 116 to the first processing controller 110_1. The first processing controller 110_1 may be configured to recognize the amount of data that needs to be restored to the multi-threaded processors 112 that it services. For example, the processing controller 110_1 may include counters to meter the amount of data that should be loaded into the multi-threaded processors 112. Alternately, a token may be used to delimit the amount of information that is to be loaded into the multi-threaded processors 112 associated with the first processing controller 110_1.

Figure 9:
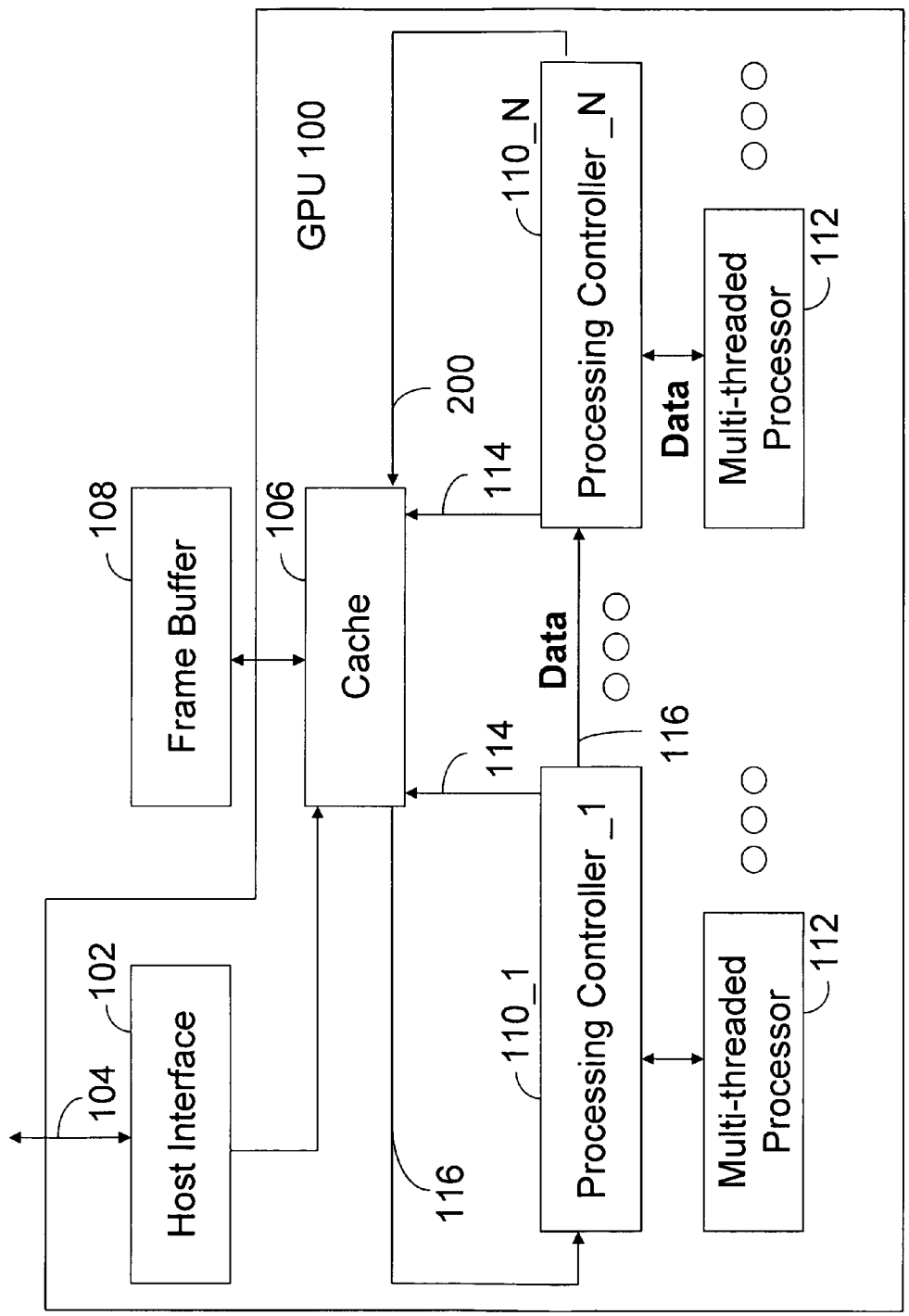
FIG. 9 illustrates another aspect of restoring state information in accordance with an embodiment of the invention.

This loading process is repeated for each processing controller 110. FIG. 9 illustrates data being loaded into the last processing controller 110_N, which, in turn, loads the data into the multi-threaded processors 112 that it services.

Thus, the invention provides for serial storing and restoring of state information. The technique avoids the use of register accesses and separate parallel paths back to the frame buffer 108. Thus, the technique avoids shortcomings associated with prior art approaches. The invention secures this new functionality through the creation of a closed loop serial bus. Conventional GPUs include an open loop serial bus. The invention extends this configuration into a closed loop serial bus to facilitate a new path to the frame buffer and thereby provide a new technique for storing and restoring state information.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A graphics processing unit, comprising:
    an interface to receive a context switch command from a central processing unit, the context switch command resulting in the generation of a context switch token;
    a first processing controller controlling a first set of multi-threaded processors;
    a second processing controller controlling a second set of multi-threaded processors;
    a cache communicating with the first processing controller and the second processing controller via a closed loop serial bus arranged to communicatively couple the first processing controller and the second processing controller to the cache in a serial closed loop path that originates at the cache and terminates back at the cache, the closed loop serial bus having a first portion coupling the first processing controller to the cache, a second portion coupling the second processing controller to the cache, and at least one intermediate portion coupling the first processing controller to the second processing controller;
    wherein the context switch token is passed from the cache to the first processing controller and is subsequently passed to the second processing controller via the closed loop serial bus to initiate preservation of state information from the first processing controller and the second processing controller for a context switch; and wherein the context switch token is directed over the closed loop serial bus from the second processing controller to the cache to indicate completion of receipt of state information from the first processing controller and the second processing controller.

2. The graphics processing unit of claim 1 wherein the interface is a host interface, and the host interface acts to receive the context switch token from the central processing unit.

3. The graphics processing unit of claim 1 in combination with a frame buffer, the frame buffer receiving state information from the cache.

4. A graphics processing unit, comprising:

an interface to receive a command from a central processing unit to initiate the restoration of state information to return to an interrupted context;

a cache storing state information previously gathered for the interrupted context;

a first processing controller controlling a first set of multi-threaded processors;

a second processing controller controlling a second set of multi-threaded processors;

a closed loop serial bus communicatively connecting the cache, the first processing controller, and the second processing controller in a serial closed loop path, the closed loop serial closed loop path originating at the cache and terminating back at the cache, the serial bus having a first portion coupling the first processing controller to the cache, a second portion coupling the second processing controller to the cache, and at least one intermediate portion coupling the first processing controller to the second processing controller;

the serial restoring of state information initiated in response to the command from the central processing unit and the cache delivering state information, a first token, and a second token over the closed loop serial bus to the first processing controller, the first processing controller selecting a first set of state information to be restored to the first set of multi-threaded processors and delivering the remaining state information and the second token over the closed loop serial bus to the second processing controller, wherein the second processing controller selects a second set of state information from the remaining state information to be restored to the second set of multi-threaded processors;

wherein the first processing controller identifies the first token to delimit the first set of state information to be restored to the first set of multi-threaded processors, and identifies the remaining state information based on the first token; and wherein the second processing controller identifies the second token to delimit the second set of state information.

5. The graphics processing unit of claim 4 wherein the first processing controller uses counters to measure the first set of state information to be restored to the first set of multi-threaded processors.

6. The graphics processing unit of claim 4 further comprising a host interface to initiate the delivery of the state information over the serial attribute bus.

7. The graphics processing unit of claim 4 in combination with a frame buffer that delivers the state information to the cache.

8. A method of operating a graphics processing unit, comprising:

receiving a command from a central processing unit resulting in the generation of a context switch token, a cache passing the context switch token into a closed loop serial bus to initiate preservation of state information for a context switch;

in response to the context switch token being received by a first processing controller, retrieving first state information from a first set of multi-threaded processors associated with the first processing controller;

routing the first state information and the context switch token over the closed loop serial bus to a second processing controller;

directing the first state information over the closed loop serial bus to the cache;

in response to the receipt of the context switch token at a second processing controller, securing second state information from the second set of multi-threaded processors associated with the second processing controller;

steering the second state information over the closed loop serial bus to the cache; and steering the context switch token over the closed loop serial bus to the cache to indicate completion of receipt of state information from the first processing controller and the second processing controller;

the closed loop serial bus arranged to communicatively couple the first processing controller and the second processing controller to the cache in a serial closed loop path that originates at the cache and terminates back at the cache, the closed loop serial bus having a first portion coupling the first processing controller to the cache, a second portion coupling the second processing controller to the cache, and at least one intermediate portion coupling the first processing controller to the second processing controller.

9. The method of claim 8 further comprising loading the first state information and the second state information from the cache into a frame buffer.

10. A method of operating a graphics processing unit, comprising:

receiving a command from a central processing unit to initiate the restoration of state information to return to an interrupted context;

delivering state information, a first token, and a second token to a first processing controller controlling a first set of multi-threaded processors;

selecting at the first processing controller a first set of state information to be restored to the first set of multi-threaded processors;

routing the remaining state information and the second token to a second processing controller controlling a second set of multi-threaded processors;

selecting at the second processing controller a second set of state information from the remaining state information to be restored to the second set of multi-threaded processors;

wherein delivering and routing is performed using a closed loop serial bus such that state information is restored in a serial manner;

the closed loop serial bus arranged to communicatively couple the first processing controller and the second processing controller to the cache in a serial closed loop path that originates at the cache and terminates back at the cache, the closed loop serial bus having a first portion coupling the first processing controller to the cache, a second portion coupling the second processing controller to the cache, and at least one intermediate portion coupling the first processing controller to the second processing controller;

wherein selecting at the first processing controller is performed using the first token to delimit the first set of state information to be restored to the first set of multi-threaded processors;

wherein selecting at the first processing controller is performed using counters to measure the first set of state information to be restored to the first set of multi-threaded processors; and wherein selecting at the second processing controller is performed using the second token to delimit the second the second set of state information to be restored to the second set of multi-threaded processors.

11. The method of claim 10 wherein the remaining state information is identified at the first processing controller based on the first token.

* * * * *